United States Patent
Darr et al.

(10) Patent No.: US 6,740,284 B2
(45) Date of Patent: May 25, 2004

(54) CONTAINER WITH IMPROVED NECK PORTION AND METHOD FOR MAKING THE SAME

(75) Inventors: Richard C. Darr, Medina, OH (US); William A. Slat, Brooklyn, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 351 days.

(21) Appl. No.: 09/862,846

(22) Filed: May 21, 2001

(65) Prior Publication Data

US 2003/0189056 A1 Oct. 9, 2003

Related U.S. Application Data

(62) Division of application No. 09/166,978, filed on Jul. 24, 2001, now Pat. No. 6,264,050.

(51) Int. Cl.$^7$ .......................... B29C 49/74; B29C 49/02
(52) U.S. Cl. ........................ 264/521; 264/536; 264/550; 264/552; 264/554; 264/908; 264/138
(58) Field of Search ................................ 264/536, 521, 264/550, 552, 554, 908, 138

(56) References Cited

U.S. PATENT DOCUMENTS 4,293,520 A * 10/1981 Akutsu ...................... 264/513
4,420,454 A * 12/1983 Kawaguchi et al. ........ 264/512
6,126,886 A * 10/2000 Beck et al. ................. 264/521

* cited by examiner

Primary Examiner—Suzanne E. McDowell
(74) Attorney, Agent, or Firm—Rader, Fishman & Grauer PLLC

(57) ABSTRACT

A plastic blow molded container having a central vertical axis constructed in accordance with the present invention includes a cylindrical upper rim, an oriented neck portion, a lower body portion, and a closed base portion. The upper rim of the container includes a top surface having a planar inner edge and an outer edge. The inner edge is generally flat and perpendicular to the vertical axis of the container and the outer edge may be curled or curved to provide additional rigidity. The oriented neck portion depends from the upper rim and includes a means to accept a closure, such as a set of integral threads. When viewed in vertical cross section, the outer vertical line formed by the outer axial points of said means to accept a closure is substantially parallel to the vertical axis of the container. The lower body portion is generally cylindrical over the majority of its vertical length. The closed base portion supports the container and depends from the lower body portion. For stability, the plane of the inner edge of the upper rim of the container is generally parallel to the plane formed by the lowermost points of the closed base portion.

16 Claims, 9 Drawing Sheets

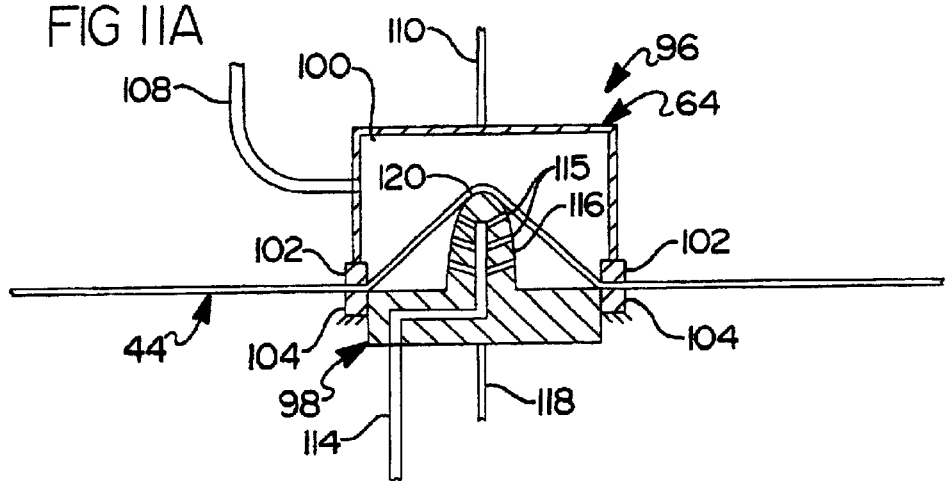
FIG 11A
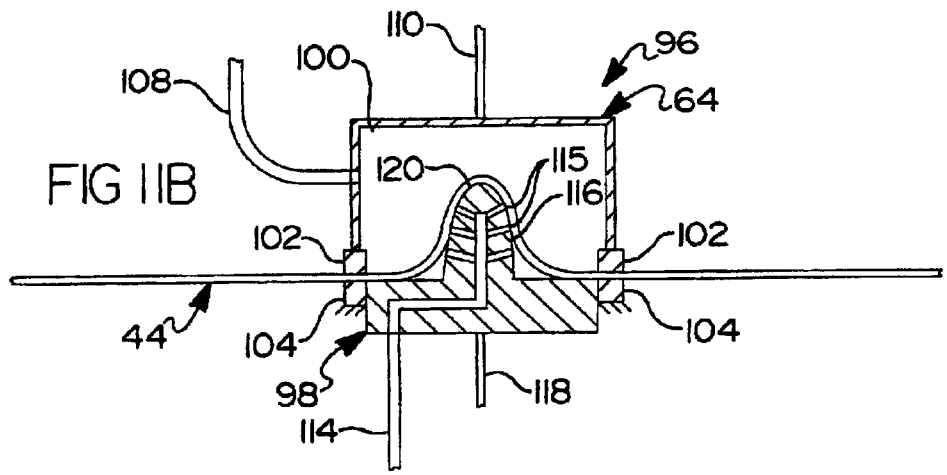
FIG 11B
FIG 11C

FIG 13
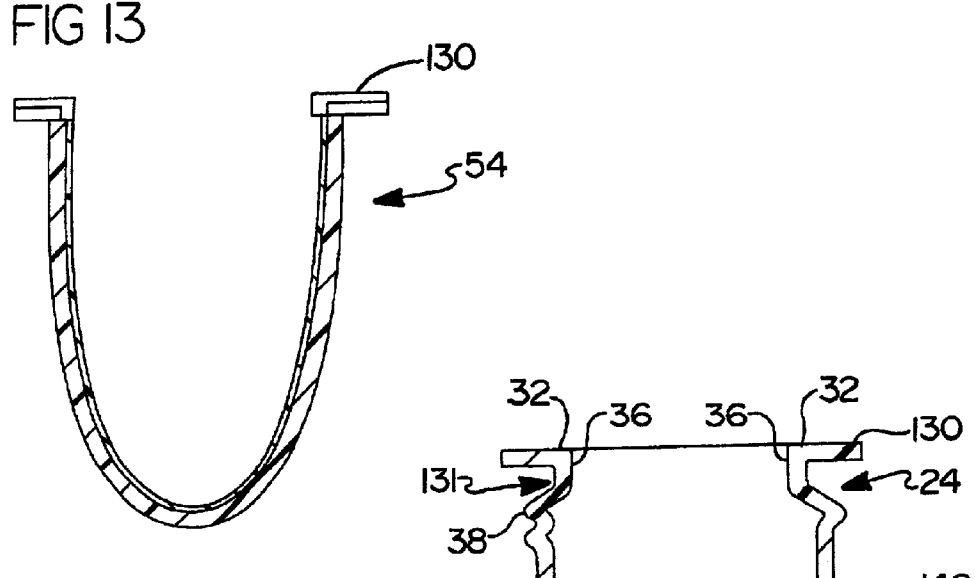
FIG 14
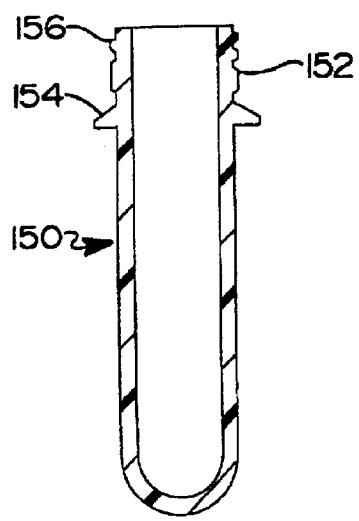
FIG 15

CONTAINER WITH IMPROVED NECK PORTION AND METHOD FOR MAKING THE SAME

This patent application is a divisional of U.S. application Ser. No. 09/166,978, Jul. 24. 2001, U.S. Pat. No. 6,264,050.

TECHNICAL FIELD

This invention relates to a plastic blow molded container having a lightweight, rigid and sealable neck portion, and the method for making such container.

BACKGROUND ART

Plastic blow molded containers having rigid neck portions are known in the art. Likewise, methods for producing containers and cups that have rims that are flat on top, including those having a rim with a rolled configuration, are also known.

However, in the production of such articles, especially those requiring a means to accept a closure and/or a handling flange, several practical issues are encountered. Such cases typically require the use of increased amounts of material in the upper portion of the container or the addition of complicated processing steps and techniques.

In some applications, a circular foil closure is sealed to the top surface of the rim of the container to protect the contents of the container from contamination and spillage. The seal between the foil and the container must be leak-proof and the contact must be good to resist movement as the products are transported. The integrity of the seal necessitates a high degree of dimensional stability in the rim portion of the container. At the same time, it is also very important that the container can withstand normal axial loading.

DISCLOSURE OF THE INVENTION

An object of the present invention is to provide a container having a flat upper rim and an oriented and dimensionally stable rigid neck portion.

Another object of the present invention is to provide a lightweight container having reduced material in the neck region.

A further object of the present invention is to provide a container that can be produced in a cost-effective manner in relatively high volumes.

Still another object of this invention is to provide a container that includes a means for securing a closure, such as a threaded cap.

Still a further object of this invention is to provide a container having wider mouth openings that are dimensionally stable and can withstand normal axial loading requirements.

Still an additional object of this invention is to produce wide-mouth containers using the same preform cavitation as more narrow-neck containers while further maintaining a similar degree of productivity.

Yet another object of this invention is to provide an improved method for producing a multilayer container having a dimensionally stable, oriented neck.

Yet a further object of this invention is to provide a container having improved features that can be produced with minimal additional capital investment.

In carrying out the above objects, a plastic blow molded container having a central vertical axis constructed in accordance with the present invention includes a cylindrical upper rim, an oriented neck portion, a lower body portion, and a closed base portion. The upper rim of the container includes a top surface having a planar inner edge and an outer edge. The inner edge is generally flat and perpendicular to the vertical axis of the container and the outer edge may be curled or curved to provide additional rigidity. The oriented neck portion depends from the upper rim and includes a means to accept a closure, such as a set of integral threads. When viewed in vertical cross section, the outer vertical line formed by the outer axial points of said means to accept a closure is substantially parallel to the vertical axis of the container. The lower body portion is generally cylindrical over the majority of its vertical length. The closed base portion supports the container and depends from the lower body portion. For stability, the plane of the inner edge of the upper rim of the container is generally parallel to the horizontal plane formed by the lowermost points of the closed base portion.

BRIEF DESCRIPTION OF DRAWINGS

FIG. 1A is an enlarged view of the encircled portion shown in FIG. 1;

FIG. 5 is a longitudinal section view showing the sheet about to be subjected to a molding operation and FIG. 6 is a longitudinal section view showing the parison as molded;

FIG. 11A is a partial view of FIG. 8 at a still further state of the thermoforming cycle;

FIG. 11B is a view similar to FIG. 9 but at a yet still further stage of the thermoforming cycle;

FIG. 11C is a view similar to FIG. 10 after completion of the thermoforming cycle to provide a formed parison;

FIG. 13 is a longitudinal section view showing one embodiment of a parison prior to blow molding;

FIG. 14 is a longitudinal section view of a container blow molded from a parison such as that shown in FIG. 13;

FIG. 15 is a longitudinal section view of a conventional multilayered preform;

BEST MODE FOR CARRYING OUT THE INVENTION

Figure 1:
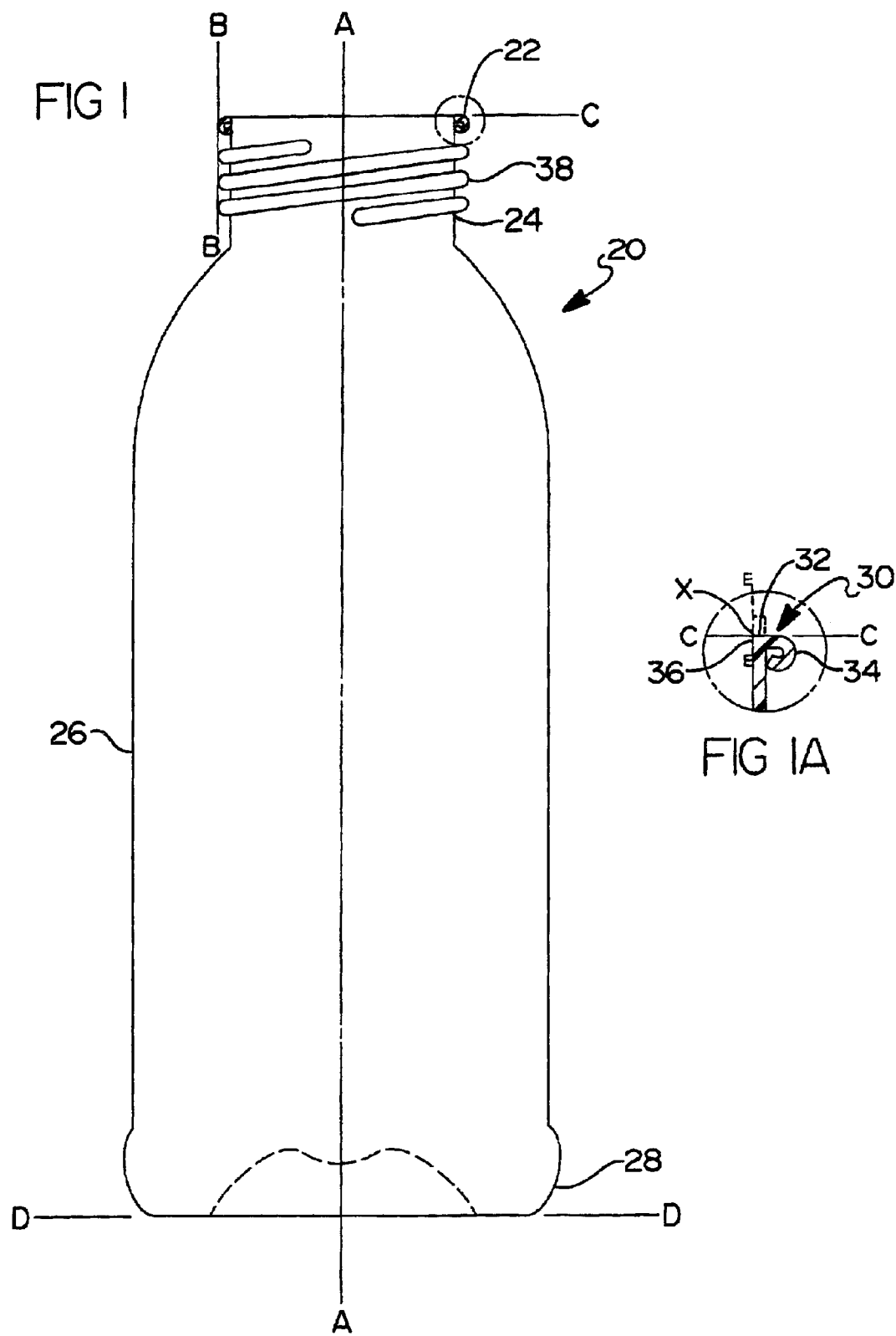
FIG. 1 is an elevational view generally showing a container produced in accordance with the present invention.

With reference to FIG. 1, a plastic blow molded container constructed in accordance with the invention is generally indicated by the numeral 20. The container 20 is most preferably manufactured from a thermoplastic polymer, or some combination or blend thereof. Examples of commonly used thermoplastic polymers include high-density polyethylene (HDPE), polyethylene terephthalate (PET), polyvinylchloride (PVC), polypropylene (PP) and low-density polyethylene (LDPE).

The container 20 has a vertical axis A running in the longitudinal direction and includes an upper rim 22, an oriented neck portion 24, a lower body portion 26, and a closed base portion 28. While FIG. 1 illustrates one embodiment of a container constructed in accordance with this invention, such a container may take any number of shapes and configurations, limited only by the imagination of the designer.

FIG. 1A illustrates an enlarged cross-sectional view of the upper rim 22, which is generally depicted by the encircled region shown in FIG. 1. As represented, the upper rim 22 further includes a top surface 30 having both a planar inner edge 32 and an outer edge 34. The inner edge 32 is flat, generally perpendicular to the vertical axis A of the container 20, and is substantially parallel to the plane on which the container rests. In practice, a variation of a few degrees from the perpendicular or parallel will sometimes occur. However, it is intended that such variation should be minimized and kept to less than approximately five degrees of variation. More preferably, if any variation exists, it will be kept to less than one or two degrees. The outer edge 34 is preferably curled, for example as shown, or curved down and inwardly toward the neck portion to provide additional rigidity.

One of the objects of this invention is to provide a solid surface for additionally sealing the container 20 and to better maintain the orientation and dimensional stability of the upper rim 22. To help accomplish that task, the inner radial edge 36 of the upper rim will be constructed so as to be normal, or within a degree or two of normal, with respect to the inner edge 32 of the top surface 30. Such a configuration eliminates a number of concerns associated with a curved transition at the corner interface that is often associated with conventional rim formation and which can lead to a less reliable seal and/or non-planar upper surfaces.

Again referring to FIG. 1, the oriented neck portion 24 depends from the upper rim 22 and includes a means to accept a closure 38. In the embodiment depicted in FIG. 1, said means is comprised of a set of conventional threads. In common practice the means to accept a closure 38 will be designed to receive and accept a closure such as a plastic or a metal cap (not shown). Based upon the novel method of manufacture further discussed below, it is worth pointing out that the container 20 of this invention does not require a comparatively heavy conventional handling flange usually located below a set of threads. The invention's ability to intentionally omit that feature can represent a significant material cost savings.

Referring once again to FIG. 1, when viewed in vertical cross section, an outer, generally vertical line B—B is formed by connection of the outer axial points of said means to accept a closure 38. To help insure the proper intended fit between the container and the closure, line B—B should be substantially parallel to the vertical axis A of the container 20 and/or substantially perpendicular to the top surface plane of the inner edge 32 of the upper rim 22. Preferably, the outer most radial portion of the outer edge 34 of the upper rim 22 should not extend so far radially from the central axis A, so as to interfere with the securing of the conventional or desired closure. In most cases, the outer most radial portion of the outer edge 34 will necessarily fall at or within the radial distance indicated by the line B—B. The lower body portion 26 is generally cylindrical and depends from and extends downwardly for a significant portion of the vertical length of the container 20. A closed base portion 28 depends from said lower body portion and supports the container in an upright position. The closed base portion may include any number of footed and non-footed configurations that are well known in the art of plastic freestanding containers. For stability, the horizontal plane formed by the top of the inner edge of the upper rim, denoted as C—C in FIGS. 1 and 1A, will be substantially parallel to the horizontal plane on which the container sits, designated as D—D in FIG. 1. For further structural integrity, plane C—C will be generally normal to the vertical axis A of the container 20.

Moreover, as further shown in FIG. 1A, the inner radial edge 36, or at least a substantial portion of the lower segment thereof, will preferably form a vertical plane. In FIG. 1A, the vertical plane is generally designated as E—E. Point X is the point in FIG. 1A that represents where the vertical plane E—E and the horizontal plane C—C intersect. It is possible that point X will be a theoretical point in space, for instance, where the formation of the outer edge 34 lead to some degree of curvature of material at the intersection of edges 32 and 36. However, in the presently preferred embodiment of this invention, such deviations occasioned by a curved interface between said edges 32 and 36 are preferably eliminated or minimized.

Figure 2:
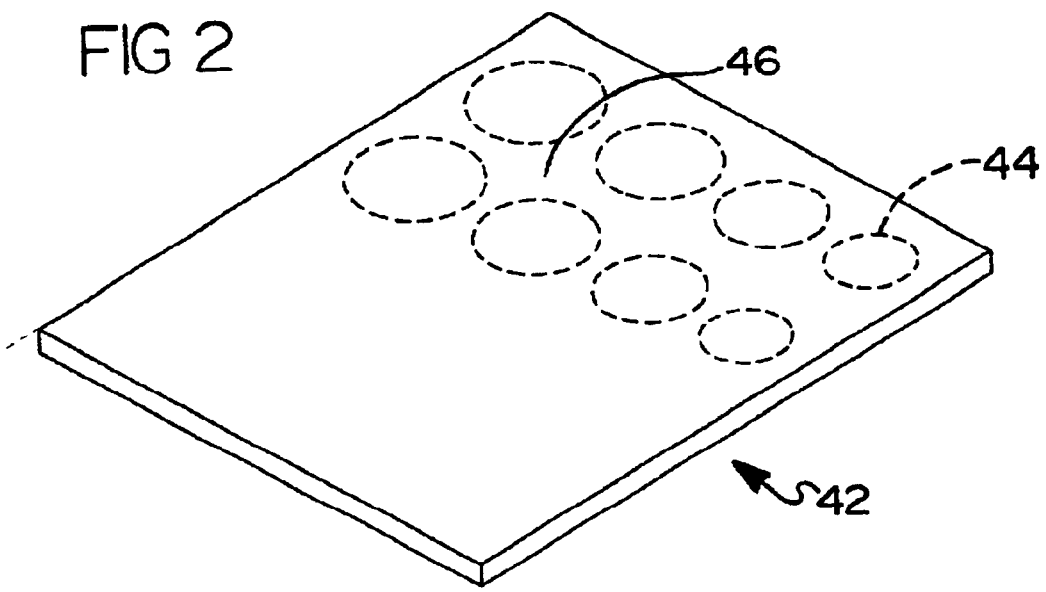
FIG. 2 is a perspective view of a monolayer extruded plastic sheet including outlines of positions that will eventually be formed into preforms and the resultant container.

FIG. 2 shows a sheet 42 that can be used to supply the material to produce a container in accordance with the present invention. While a monolayer sheet is depicted, the sheet used can consist of a plurality of different layers. The phantom-line disks 44 illustrated represent a plurality of individual segments that can be subsequently thermoformed into preforms. It is important to mention that the pattern of disks is not limited to that shown. For example, the disks 44 could be formed in a straight line, the pattern of formation of disks 44 could be staggered, or the formation could be done in any number of configurations of rows or columns provided that the same can be accommodated by the available equipment. As a practical matter, the material in between the disks 46 will later be separated and recovered for subsequent use.

Figure 3:
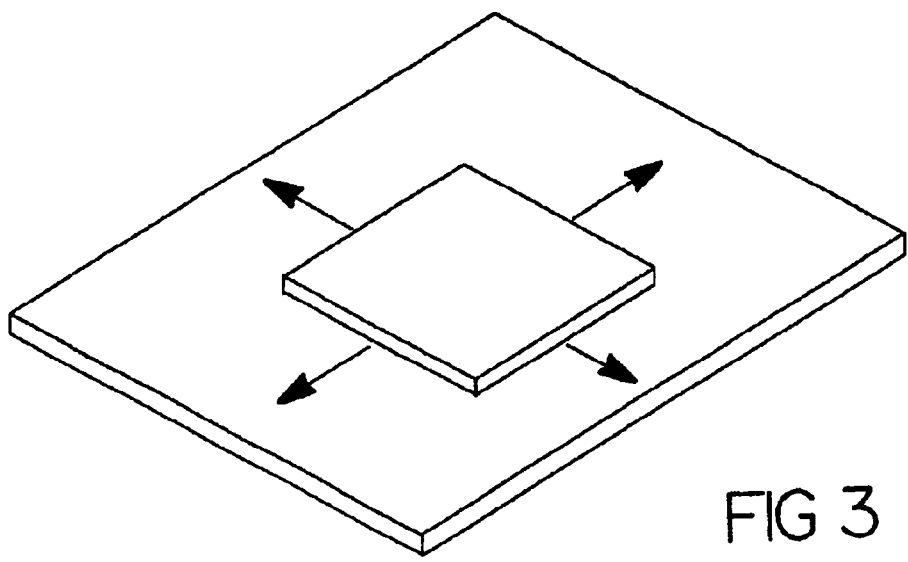
FIG. 3 is a perspective view showing how a sheet of material can be stretched in four directions to impart biaxial orientation.

As illustrated in FIG. 3, a sheet of material can be stretched in four directions to impart biaxial orientation. Molecular orientation is one of the most important factors affecting the fracture resistance of a molded or formed plastic article. Biaxial stretching makes a thermoplastic polymer much more resistant to crazing and cracking under the action of in-plane stresses, and is used to improve the properties of films and sheets. Blowing and stretching will subsequently be used to further increase the amount of biaxial orientation of a given sheet of material.

Figure 4:
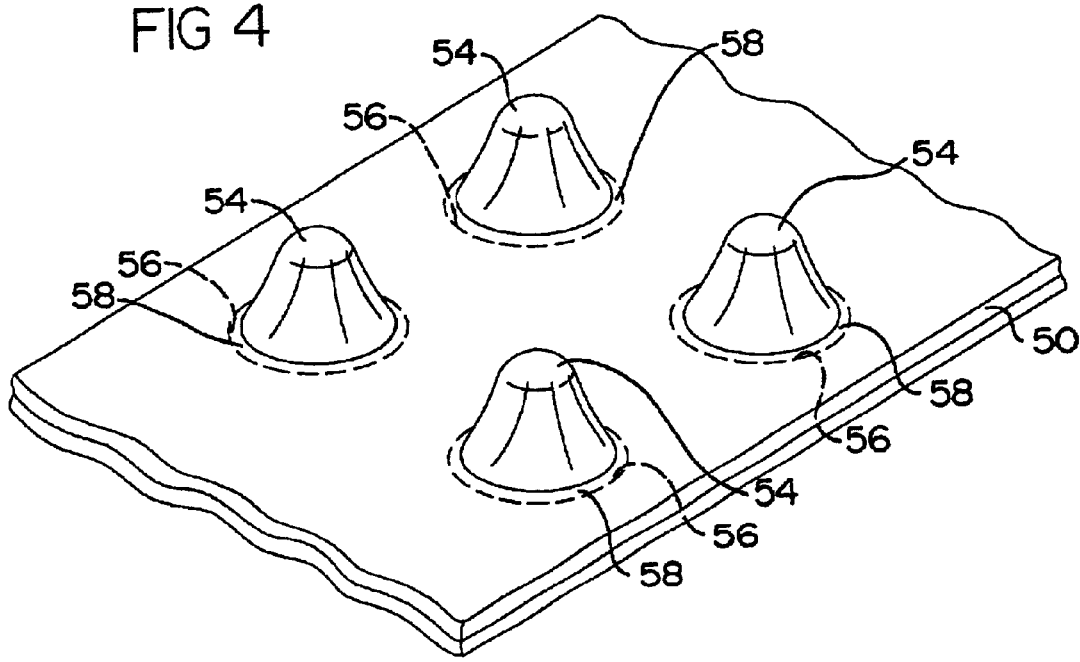
FIG. 4 is a schematic representation of a multilayer sheet at an intermediate stage in the formation of a plurality of preforms.

FIG. 4 depicts a multilayer sheet 50 at an intermediate stage in the formation of the disks 44 into a plurality of preforms 54. The dotted-line portions of the preform 56 represent the locations where the preforms will be severed from the sheet 50. The annular regions 58 represent the portion of the preform that will be used form the upper rim 22 of the container 20.

Figure 5:
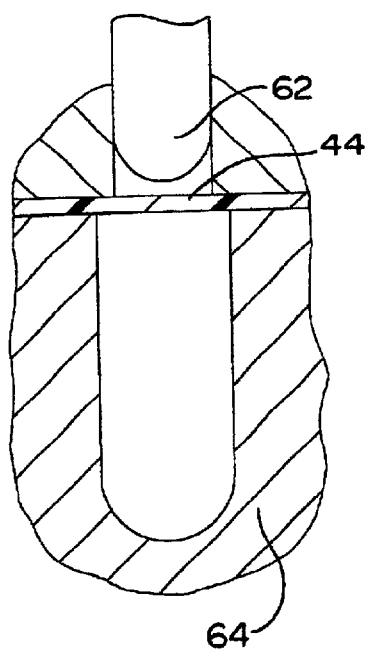
FIGS. 5 and 6 illustrate the impact molding process in which a parison is directly molded from the extruded sheet of material, where
Figure 6:
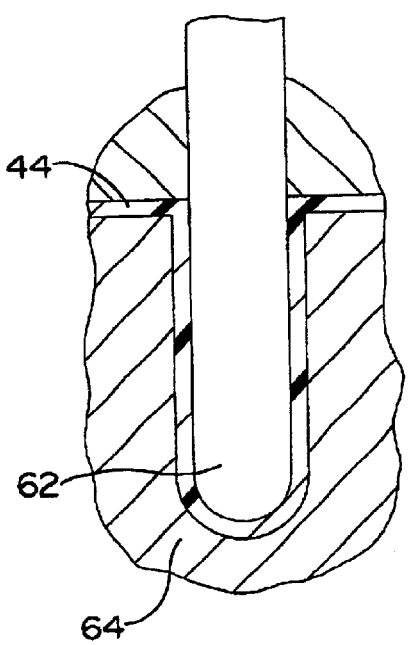

With reference to FIGS. 5 and 6, an impact molding process is shown as one method of forming a preform from an extruded sheet of material 42. FIG. 5 is a longitudinal section view showing the sheet 42 about to be subjected to a molding operation. FIG. 6 is a longitudinal section view that shows the sheet 42 being molded to conform to the space between the male member 62 and the mold portion 64.

Figure 7:
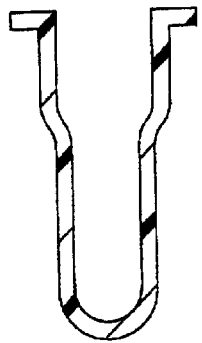
FIG. 7 illustrates a longitudinal section view of one form of parison that can be molded from the extruded sheet.
Figure 8:
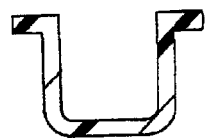
FIG. 8 illustrates a longitudinal section view of another form of parison that can be molded from the extruded sheet.

The preforms shown being formed in FIGS. 4, 7 and 8 are representative of several common preform configurations. While an infinite number of preform structures are theoretically possible, preform design is typically limited by the shape and size of the desired container and available mold space, in addition to any removal, handling and operational considerations.

Figure 9:
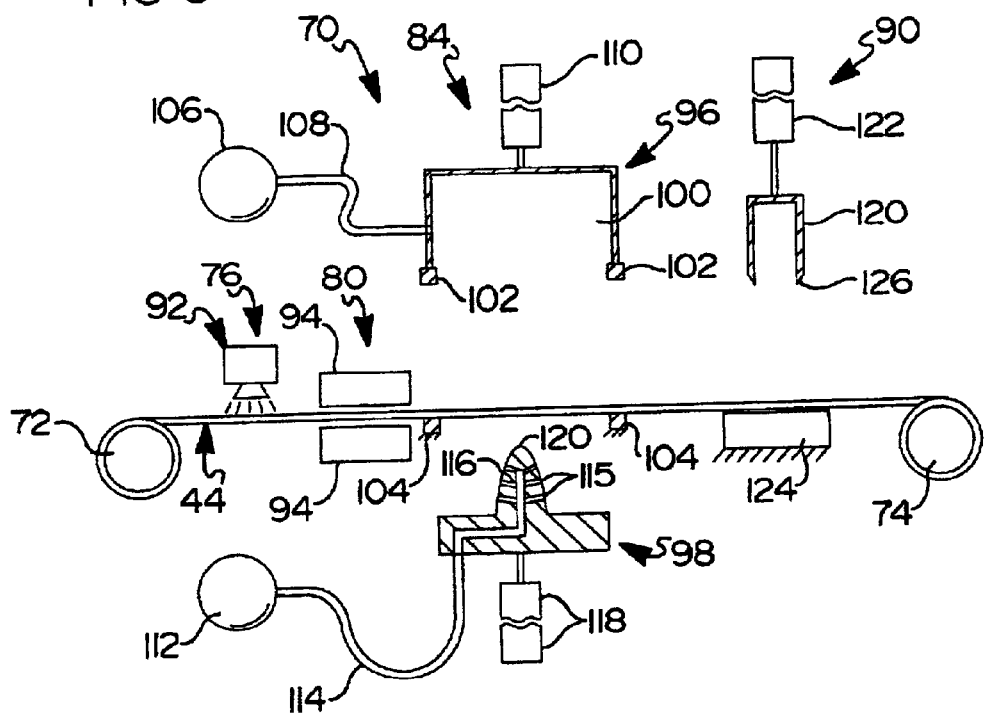
FIG. 9 is an elevational view illustrating apparatus that may be utilized to thermoform the extruded sheet illustrated at an initial stage of a cycle of operation.

Referring to FIG. 9, an alternative manufacturing system 70 that may be used to thermoform the extruded sheet 44 into a preform is illustrated at an initial stage of a cycle of operation. The sheet 44 shown being supplied from a supply roll 72 is moved toward the right therefrom to a scrap roll 74 through a manufacturing system 70. The manufacturing system 70 shown includes a barrier spot station 76, a heating station 80, a thermoforming station 84, and a trimming station 90 at which the formed preform is trimmed from the rest of the sheet 44 as later illustrated in FIG. 12.

As illustrated in FIG. 9, a barrier layer in the form of spots or other discrete shapes may be provided at the barrier station 76. In connection with the station 76, a spray apparatus 92 is used to provide a controlled spray of barrier material. Some of the different types of materials that may be employed to provide a barrier include polyethylene naphthalate, polyvinylidene chloride, nylons, ethylene-vinyl alcohol, oxygen-scavengers, and various combinations, layering schemes and blends of such materials. The heating station 80 includes at least one heater 94 and preferably includes a pair of opposed heaters 62 as illustrated between which the sheet 44 is moved for heating. The heaters may be of any suitable type, such as gas, electric resistance, etc. to provide sufficient heating of the sheet 44 for softening in preparation for thermoforming.

With continued reference to FIG. 9, the thermoforming station 84 is located downstream from the heating station 80 and includes a vacuum enclosure 96 located above (as depicted) or below the sheet 44. While the preforms may be vacuum formed with a relatively large amount of pressure without additional formation assistance, the thermoforming station may also include a male vacuum mold 98 located on the opposite side of the sheet 44 as the vacuum enclosure 96. As more fully described hereinafter, male vacuum mold 98 can be used to cooperate with the vacuum enclosure 96 to provide thermoforming of the preform.

Figure 10:
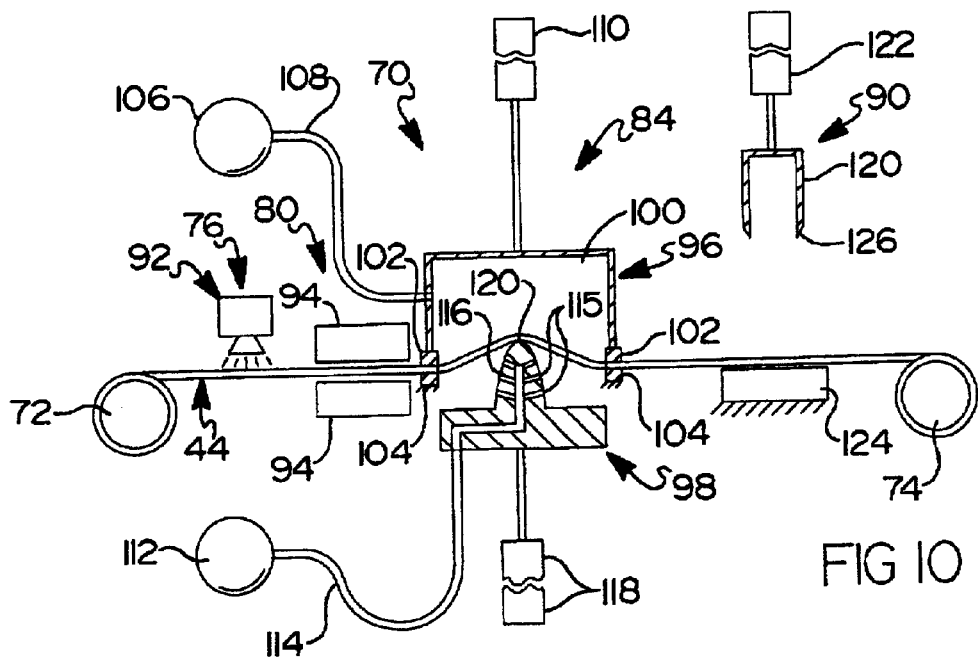
FIG. 10 is a view similar to FIG. 7 at a later stage in the thermoforming cycle.

The vacuum enclosure 96 of the thermoforming station 84 as shown in FIG. 9 defines a vacuum chamber 100 and has a lower peripheral seal 102. The sheet is movable over a stationary peripheral support 104 that conforms to the shape of the lower peripheral seal 102 of the vacuum enclosure 96. A vacuum source 106 is communicated by a suitable conduit 108 with the vacuum chamber 100 to draw a vacuum within the chamber 100 during the thermoforming operation. An actuator 110 of any suitable type moves the vacuum enclosure 96 toward the stationary peripheral support 104 such that its lower seal 102 cooperates with the peripheral support to clamp the sheet 44 and seal the chamber 100. A vacuum is then drawn as shown in FIG. 10 within the vacuum chamber 100 such that the sheet 44 is formed and biaxially stretched upwardly (in the case with the vacuum enclosure above) to form the shape of the preform.

When included in the system 70, the male vacuum mold 98 of the thermoforming station 84 is located on the opposite side of the sheet 44 as the vacuum enclosure 96. The male vacuum mold 98 includes a vacuum source 112 that is communicated by a suitable conduit 114 with passages 115 of the male vacuum mold 98. The passages 115 extend to the male mold surface 116, which generally conforms to the inner surface of the preform being formed. The male vacuum mold 98 includes an actuator 118 for providing movement to and from the sheet and the vacuum enclosure 96. During the initial part of the cycle, the male vacuum mold 98 is moved toward the sheet 44 as shown in FIG. 10. A distal end 120 of the male vacuum mold surface 116 engages one surface of the sheet 44. A vacuum is sequentially drawn through the male vacuum mold 98 as is hereinafter more fully described in connection with FIGS. 11A–C to form the sheet 44 generally to the shape of the male vacuum mold. In systems that do not employ the assistance of a male vacuum mold 98, the vacuum provided in the chamber 100 will need to be sufficient to force the sheet to conform to the shape of the mold surface contained within the vacuum enclosure 96. The vacuum required will usually be higher because the drawing will be without the additional benefit of the mechanical assistance provided by a male vacuum mold 98.

With reference to FIG. 11A, the vacuum provided within the vacuum chamber 100 of the vacuum enclosure 96 is maintained after initial engagement of the male vacuum mold 98 with the sheet 44 and while the male vacuum mold 98 is thereafter moved to form the heated sheet 44 as shown in FIG. 11A. The upward movement of the male vacuum mold 98 under the operation of the actuator 118 is then terminated and the vacuum drawn at the vacuum chamber 100 of the vacuum enclosure 96 is terminated. The termination of the vacuum within the vacuum chamber 100 causes the sheet 44 to further deform to the shape of the male vacuum mold 98 as shown in FIG. 11B even before the vacuum is drawn through the male vacuum mold 98. Drawing of the vacuum through the male vacuum mold 98 by the conduit 114 communicated with the mold passages 115 conforms the sheet 44 to the mold surface 116 as shown in FIG. 11C.

Figure 12:
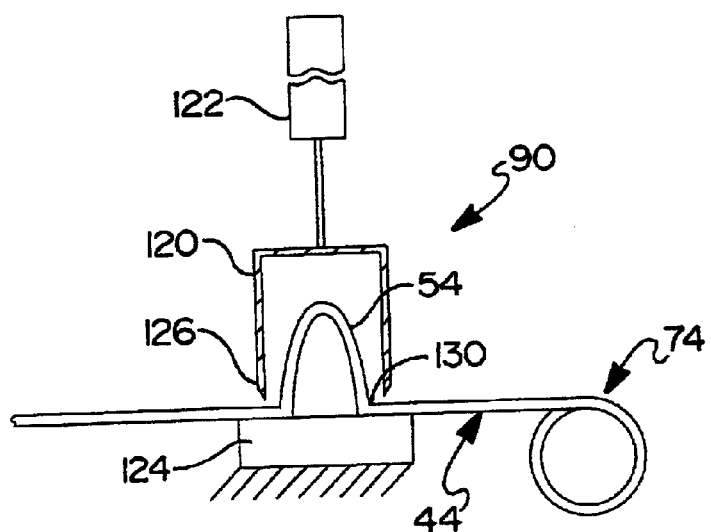
FIG. 12 is a view illustrating operation of a ring station where preforms are cut from the sheet.

Irrespective of the method of forming chosen to mold the preform from a sheet of material, at some point in the process, either before, during or after the forming operation, the material comprising the preform must be separated from the sheet 44. It is possible to separate the disks of material from the sheet 44 prior or during the forming operation. However, that involves additional handling precision and other processing complications. The preferred construction involves the separation of the preform from the sheet following the forming process at a trimming station 90 as generally depicted in FIGS. 9 and 10. With reference now to FIG. 12, the trimming station includes a trimming member 120 moved by an actuator 122 toward and away from a lower support surface 124 over which the formed preform is moved with the rest of the sheet 44 downstream from the thermoforming station 84. Downward movement of the trimming member 120 under the operation of the actuator 122 engages a lower sharpened edge 126 thereof with the sheet 44 to cut the preform 54, including the upper rim-forming portion 130, from the rest of the sheet. The remainder of the material of the sheet not used to form the preform is then received by the scrap roll 74 or is sent to some other means of collection.

After the trimming operation illustrated in FIG. 12, a preform 54 such as that shown in FIG. 13 is produced. At this stage, the preform 54 includes a substantially flat upper rim-forming portion 130. The preform is then transferred to a blow molding station (not shown) where the preform 54 is blow molded into a container 140 with a rim-forming portion 130 such as that shown in FIG. 14. The container 140 also includes an oriented neck portion 24, which may further include a means to accept a closure 38, such as conventional threads, a lower body portion 26, and a closed base portion 28. A stepped-in portion 131 is preferably provided adjacent the flat upper rim-forming portion so that when the rim-forming portion 130 is later formed, it can retain its orientation while not interfering with the application of a closure, such as a conventional cap.

With the blow molding process, it is important that the rim-forming portion 130 is properly secured in order to maintain its structural integrity and orientation. This is especially important at the junction of the inner radial end 36 and the inner edge 32 of the top surface of the upper rim 22 previously discussed in connection with FIG. 1. In a preferred embodiment of this invention, the inner edge 32 of the top surface of the upper rim 22 will meet the inner radial edge 36 at a right angle, plus or minus approximately 1° to 5%. With appropriate constraints such as plugs, holding surfaces and other means to maintain the relative positions of edges 32 and 36 incorporated into the remaining formation of the container, that angle should not be appreciably different from that encountered in the final resultant article. Moreover, the preferred connection between the edge 36 and the top surface of the upper rim exhibits a sharper transition than that accompanying free-bending operations in which the inner radial edge 36 and portions of the upper inner edge 32 are not held. Because one or both of the edges are at least partially held during the later forming operations, the point at which the edges 32 and 36 meet will not exhibit a large amount of surface curvature at their intersection. Such a configuration not only helps to insure the proper vertical and axial positioning of the edges 32 and 36, but improves the integrity of the seal in instances where a foil-like disk or other barrier must be properly applied to the top surface of the article.

While the foregoing has discussed the production of a preform in detail, preforms such as the type illustrated in FIG. 13 could be using a variety of other methods. For example, conventional injection or compression molding processes could form a preform 54 having a rim-forming portion 130. However, in such cases, the preform and the rim-forming portion 130 would not have the benefit of the same degree of orientation prior to being blow molded as in the case of a preform 54 formed in connection with the forming processes more specifically described herein.

An alternative method of producing high volumes of wide-mouth containers 140 with rim-forming portions 130 such as the one shown in FIG. 14 involves the use of a conventional injection-molded preform 150 such as that shown in FIG. 15, which illustrates a longitudinal cross-section of a conventional multi-layered preform 150. The conventional preform 150 includes a neck 152 and a handling means 154, such as a neck flange. The conventional preform 150 also may or may not include a traditional set of threads 156 designed to accept a closure. In forming the container 140 having a rim-forming portion 130 such as that shown in FIG. 14, said conventional preform 150 is transferred to a blow molding machine where it is typically handled and held by the neck 152 and the handling means 154, which may or may not include a threaded portion. The preform 150 can then be blow molded into the intermediate article 160 illustrated in FIG. 16. The intermediate article 160 comprises an upper discard portion 162 and a lower portion 164 that generally takes on the form of the container 140 having a rim-forming portion 130 and an oriented neck. For the reason previously mentioned in connection with FIG. 14, a stepped-in portion 131 is preferably included below the rim-forming portion 130. The oriented neck portion provides the benefit of full orientation without the burden and additional cost and weight associated with a conventional handling flange.

The diameter of the oriented neck of the container, identified as $D_1$, can be several times the diameter of the mouth of the injection-molded preform, identified as $D_2$. Typically, as the ratio of $D_1$ to $D_2$ increases, the amount of orientation will be increased, and the physical characteristics of that portion of the resultant container will be improved. In practice the preferred ratio $D_1$ to $D_2$ will be in the nature of 3:1 or 4:1, but higher ratios can be accommodated. Apart from handling considerations, the shape of the upper discard portion 162 is generally not significant. However, to reduce the amount of subsequent recycling required, the amount of material constituting the upper discard portion 162 preferably is minimized to the extent possible.

Figure 16:
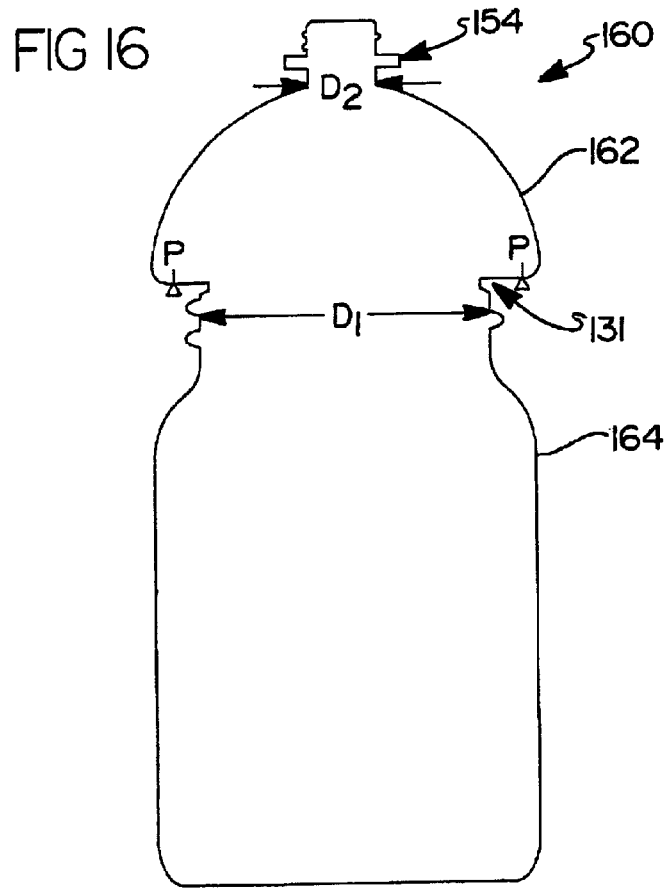
FIG. 16 is a view of one configuration of an intermediate article that can be blow molded from the preform shown in FIG. 15.

The upper discard portion 162 is subsequently trimmed from the intermediate article 160 at a position designated as P on FIG. 16 by any number of high-speed conventional cutting processes (not shown). In one such method, the article 160 is rotated over and onto a strategically placed blade so as to make the necessary cut at a defined radial position from the central axis. The upper discard portion that has been severed and removed will be captured and can be recycled and subsequently reused.

The preceding methods are very attractive for a number of practical reasons. First, it permits manufacturers to produce a comparatively wide-mouth container (such as that with greater than a 28 mm or 38 mm opening) with a very rigid opening and upper structure without the use of heavy, injection-molded necks. This can result in significant material cost savings. Second, the method lends itself to the use of high cavitation conventional preform tools. Blowing can be accomplished at relatively high speeds in that there are no comparatively thick portions by comparative standards. This provides a high level of productivity for a relatively minimal capital investment. At the same time, the methods described provide a container having a reliably solid, flat and sealable rim top surface.

Figure 17:
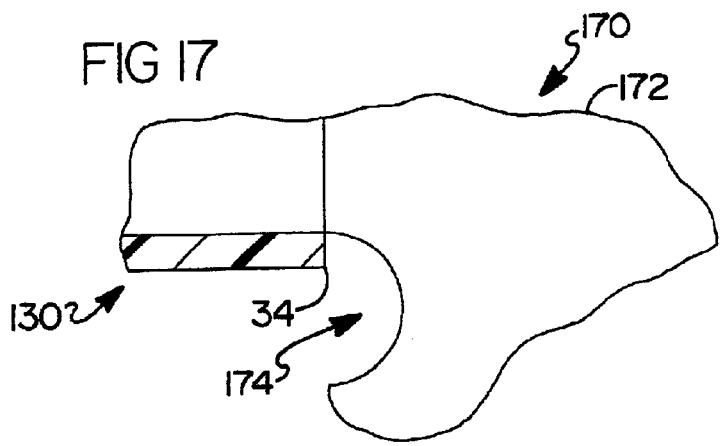
FIGS. 17, 18 and 19 are enlarged views of a portion of an apparatus that illustrate the rolling of the leading edge of the rim-forming portion of the container.
Figure 18:
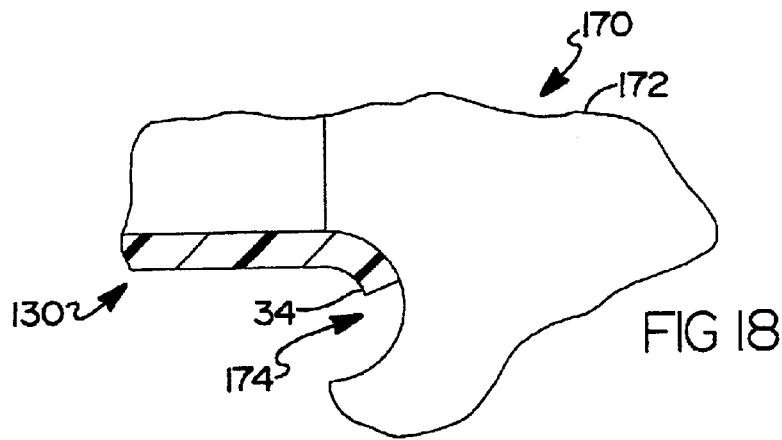
Figure 19:
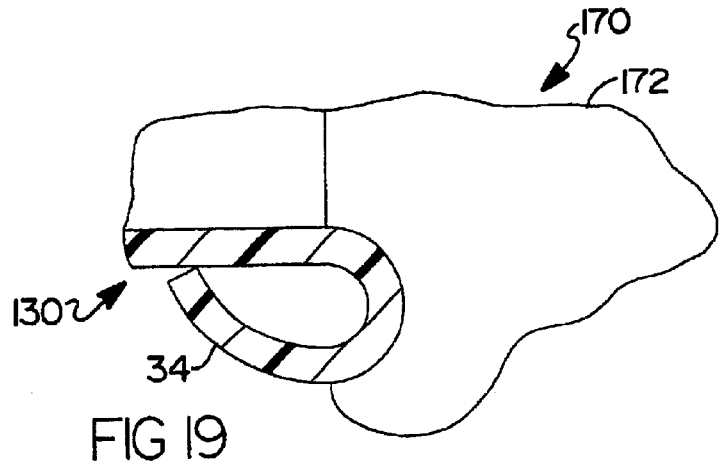

Irrespective of the method used to form the container 140 with an oriented neck and a rim-forming portion 130 as that shown in FIG. 14, the invention contemplates the formation of a rigid upper rim. FIGS. 17 through 19 illustrate three segments of one of the many known methods that may be used to form the rim-forming portion 130, and more specifically, what has been previously referred to as the outer edge 34 of the upper rim 22. In the instant method depicted, the formation of the rim is accomplished by axially forcing, or "rolling," the upper rim-forming portion 130 into a rim-forming apparatus 170. The rim-forming apparatus includes an annular rim-forming die 172, which further includes an open-mouth cavity 174. The interior of the cavity 174 is relatively smooth to promote sliding of the portion of the upper rim 22 when it is formed therein. The mouth of the cavity 174 is oriented substantially transversely to the body of the container 140. As taught in the art, the shape and radius of the cavity 174 can be modified with respect to the thickness of the material being formed so as to provide a rim having a wide variety of possible configurations. One of the preferred "rolled" configurations is shown in the enlarge view shown in FIG. 1A where the outer portion of the rim has been formed in the shape of a semi-circle.

Figures 20, 21:
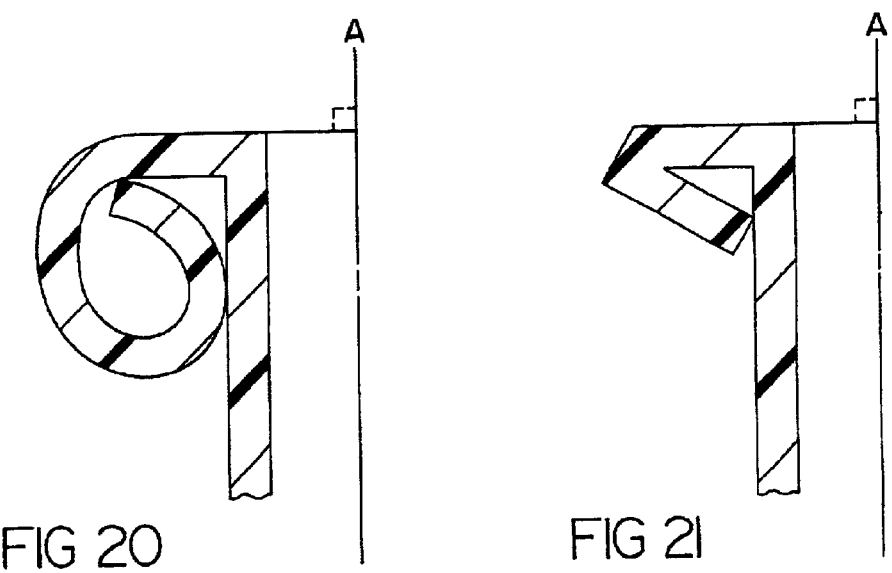
FIG. 20 is an enlarged fragmented sectional view of the upper rim of a container produced in accordance with this invention.
FIG. 21 is an enlarged fragmented sectional view of a different embodiment of the upper rim of a container produced in accordance with this invention.

Although not illustrated in FIGS. 17 through 19, the planar inner edge 32 and inner radial edge 36 of the upper rim 22 are appropriately held in place so as to be generally unaffected by the rim-forming apparatus 170 and procedure. Holding or securing the edges 32 and 36 during the formation of the outer portion of the rim 22 provides an outer rim that exhibits improved rigidity while still generally maintaining the dimensional stability, orientation and functionality of the remainder of the rim 22. While not depicted, the rim-forming apparatus shown in FIG. 19 may include further formation components (not illustrated) to further roll the outer edge 34 of the upper rim 22 into a tighter spiral, such as that depicted in FIG. 20. FIG. 20 is in fact an enlarged fragmented sectional view of one embodiment of the upper rim of a container produced in accordance with this invention. The following figure, FIG. 21, depicts another embodiment of the rim in which the outer edge 34 has been bent down and inwardly into the neck rather than being curled as shown in FIG. 20.

Though not required, the container, and more particularly the upper rim and neck, may be finished by a mechanical process. Where contact is important, the mechanical finishing process may include, for example, an additional sanding, grinding, or polishing operation applied to the upper surface of the rim 22 of the preform 54 or container 20. For specialized applications, the upper rim 22 and neck 24 may be further subjected to additional heat treatment and/or additionally crystallized to further impart desirable physical properties or characteristics.

While the best modes for carrying out the invention have been described in detail, persons familiar with the art to which the invention relates will recognize various alternative ways of practicing the invention as described by the following claims.

What is claimed is:

1. A method for making a blow molded plastic container, the method comprising:
   providing a sheet of thermoplastic material;
   securing at least a portion of the sheet;
   providing a mold having a mold surface;
   forming at least a portion of the sheet against the mold surface to shape a preform having an upper rim-forming portion;
   separating the preform having an upper rim-forming portion from the sheet;
   blow molding the preform to form a container having a central vertical axis, an oriented neck portion and an upper rim including a planar inner edge, an outer edge, and an inner radial edge; and
   mechanically forming at least a portion of the outer edge of the upper rim wherein the planar inner edge and the inner radial edge of the container intersect to form a substantially perpendicular corner that is substantially square when viewed in cross section.

2. The method of claim 1, wherein the blow molded container further includes a means to accept a closure.

3. The method of claim 2, wherein said means to accept a closure is oriented.

4. The method of claim 2, wherein said means to accept a closure includes a threaded portion.

5. The method of claim 1, wherein the upper rim-forming portion of the preform is secured prior to blow molding the container.

6. The method of claim 1, wherein the plane formed by the inner edge of the upper rim is substantially perpendicular to the central vertical axis of the container.

7. The method of claim 1, wherein the plane formed by the inner edge is substantially perpendicular to the plane formed by the inner radial edge.

8. The method of claim 1, including the additional step of heat-treating at least a portion of the mechanically formed upper rim to impart an additional level of crystallization.

9. The method of claim 1, including the step of mechanically finishing at least a portion of the top surface of the upper rim.

10. A method for making a blow molded plastic container, the method comprising:
    providing a plastic preform;
    blow molding the preform to form an intermediate article having a central vertical axis;
    an upper discard portion; and upper rim having a planar inner edge, an outer edge, and an inner radial edge; an oriented neck portion, a lower body portion, and a closed base portion;
    removing the upper discard portion from the intermediate article; and
    mechanically forming at least a portion of the outer edge of the upper rim wherein the planar inner edge and the inner radial edge of the container intersect to form a substantially perpendicular corner that is substantially square when viewed in cross section.

11. The method of claim 10, wherein the neck portion includes a means to accept a closure.

12. The method of claim 11, wherein said means to accept a closure is oriented.

13. The method of claim 11, wherein said means to accept a closure includes a threaded portion.

14. The method of claim 10, wherein the plane formed by the inner edge of the upper rim is substantially perpendicular to the plane formed by the inner radial edge.

15. The method of claim 10, including the step of heat-treating at least a portion of the mechanically-formed upper rim to impart additional crystallization.

16. The method of claim 10, including the step of mechanically finishing at least a portion of the top surface of the upper rim.

* * * * *